US012611823B2

(12) United States Patent
Tsotsis

(10) Patent No.: US 12,611,823 B2
(45) Date of Patent: Apr. 28, 2026

(54) IN-TOOL COMPACTION FOR COMPOSITE STRUCTURES

(71) Applicant: The Boeing Company, Arlington, VA (US)

(72) Inventor: Thomas Karl Tsotsis, Santa Ana, CA (US)

(73) Assignee: The Boeing Company, Arlington, VA (US)

( * ) Notice: Subject to any disclaimer, the term of this patent is extended or adjusted under 35 U.S.C. 154(b) by 110 days.

(21) Appl. No.: 18/473,836

(22) Filed: Sep. 25, 2023

(65) Prior Publication Data

US 2024/0190087 A1     Jun. 13, 2024

Related U.S. Application Data

(63) Continuation-in-part of application No. 18/065,458, filed on Dec. 13, 2022.

(60) Provisional application No. 63/498,330, filed on Apr. 26, 2023.

(51) Int. Cl.
| | |
|---|---|
| *B29C 70/46* | (2006.01) |
| *B29C 33/60* | (2006.01) |
| *B29C 70/54* | (2006.01) |
| *B29L 31/30* | (2006.01) |

(52) U.S. Cl.
CPC ............ *B29C 70/462* (2013.01); *B29C 33/60* (2013.01); *B29C 70/54* (2013.01); *B29L 2031/3076* (2013.01)

(58) Field of Classification Search
CPC ..... B29C 33/485; B29C 33/505; B29C 33/76; B29C 33/60
See application file for complete search history.

(56) References Cited

U.S. PATENT DOCUMENTS

| | | | | | |
|---|---|---|---|---|---|
| 4,721,593 | A | * | 1/1988 | Kowal | ............... B29D 99/0014 264/516 |
| 5,059,377 | A | * | 10/1991 | Ashton | .............. B29D 99/0014 264/225 |
| 5,152,949 | A | * | 10/1992 | Leoni | .................. B29C 43/3642 425/389 |

(Continued)

FOREIGN PATENT DOCUMENTS

| | | |
|---|---|---|
| EP | 0142697 A1 | 5/1985 |
| EP | 1473132 A2 | 11/2004 |

(Continued)

OTHER PUBLICATIONS

European Patent Office Extended Search Report, dated May 10, 2024, regarding Application No. EP23216222.2, 8 pages.

(Continued)

*Primary Examiner* — Matthew J Daniels
(74) *Attorney, Agent, or Firm* — Yee & Associates, P.C.

(57) ABSTRACT

An in-tool system for compacting an out-of-plane feature of a composite structure. The in-tool system comprises a cavity formed in a tool, a stiffener preform, and an insert. The cavity has an angled surface. The stiffener preform includes an out-of-plane feature, where the out-of-plane feature has a compaction surface. The insert comprises a first face complementary to the angled surface of the cavity and a second face complementary to the compaction surface of the out-of-plane feature. The first face is opposite the second face.

20 Claims, 8 Drawing Sheets

(56)                References Cited

U.S. PATENT DOCUMENTS

| | | | |
|---|---|---|---|
| 6,702,911 | B2 | 3/2004 | Toi et al. |
| 2005/0257887 | A1 | 11/2005 | Tsotsis |
| 2007/0063378 | A1* | 3/2007 | O'Donoghue .......... B29C 33/40 |
| | | | 425/406 |
| 2008/0302912 | A1 | 12/2008 | Yip et al. |
| 2010/0239865 | A1* | 9/2010 | Kallinen ................ B29C 70/44 |
| | | | 156/196 |
| 2010/0295210 | A1* | 11/2010 | Le Hetet ........... B29D 99/0014 |
| | | | 264/258 |
| 2011/0206875 | A1 | 8/2011 | Kohlen |
| 2014/0353876 | A1 | 12/2014 | Murai et al. |
| 2016/0339615 | A1* | 11/2016 | Abe .................. B29D 99/0014 |
| 2020/0079038 | A1* | 3/2020 | Tessier .............. B29D 99/0014 |
| 2023/0294371 | A1 | 9/2023 | Kitazawa et al. |

FOREIGN PATENT DOCUMENTS

| | | | |
|---|---|---|---|
| EP | 2121295 | A1 | 11/2009 |
| EP | 3115185 | A1 | 1/2017 |
| EP | 4059688 | A1 | 9/2022 |
| EP | 4088915 | A1 | 11/2022 |
| GB | 2475523 | A | 5/2011 |
| WO | 2022190282 | A1 | 9/2022 |

OTHER PUBLICATIONS

European Patent Office Extended Search Report, dated May 29, 2024, regarding Application No. EP23216216.4, 8 pages.
Tsotsis et al., "Methods for Manufacturing Hat-Stiffened Structures," U.S. Appl. No. 18/065,458, 45 pages.
Office Action, dated Aug. 6, 2025, regarding U.S. Appl. No. 18/065,458, 24 pages.
European Patent Office Extended Search Report, dated Jan. 21, 2026, regarding Application No. EP25199056.0, 6 pages.

* cited by examiner

800

802 — SPECIFICATION AND DESIGN

804 — MATERIAL PROCUREMENT

806 — COMPONENT AND SUBASSEMBLY MANUFACTURING

808 — SYSTEM INTEGRATION

810 — CERTIFICATION AND DELIVERY

812 — IN SERVICE

814 — MAINTENANCE AND SERVICE

900

AIRCRAFT

902 — AIRFRAME     INTERIOR — 906

SYSTEMS

PROPULSION SYSTEM

ELECTRICAL SYSTEM 908    912

910    914

HYDRAULIC SYSTEM

ENVIRONMENTAL SYSTEM

904

IN-TOOL COMPACTION FOR COMPOSITE STRUCTURES

CROSS-REFERENCE TO RELATED APPLICATIONS

This application claims the benefit of U.S. Provisional Patent Application Ser. No. 63/498,330, filed Apr. 26, 2023, entitled "In-Tool Compaction for Composite Structures," and is a Continuation-in-Part of U.S. patent application Ser. No. 18/065,458, filed Dec. 13, 2022, entitled "Methods for Manufacturing Hat-Stiffened Structures," both of which are incorporated herein by reference.

BACKGROUND INFORMATION

1. Field

The present disclosure relates generally to methods and equipment for making composite structures. More specifically, the present disclosure relates to a system for in-tool compaction of out-of-plane features during fabrication of large fibrous composite structures such as aircraft stiffeners using dry-fabric preforms and resin infusion.

2. Background

The compaction of out-of-plane features in an integrally stiffened structure is difficult to perform in situ, especially in a monolithic, for example, non-segmented tool. Separate work cells with associated equipment, tooling, floor space, consumables, etc. are currently required to perform compaction of a stiffening element with out-of-plane features, such as a blade or a "T" stiffener.

Current methods rely on secondary operations and associated tooling facilities to perform preform compaction to enable it to fit into a tooling cavity. If the bulk of out-of-plane feature is too large, there is a high probability of the feature physically impacting the tool during preform loading and damaging the preform. Current methods may also rely on high Coefficient-of-Thermal-Expansion (CTE) tooling to impart compaction. However, the time and energy required to heat to functional temperatures in order to impart the compaction and the time required to subsequently cool the tool in order to allow extraction of the part from the tool is costly, especially for large aircraft structures.

Therefore, it would be desirable to have a method and apparatus that takes into account at least some of the issues discussed above, as well as other possible issues.

SUMMARY

An illustrative embodiment of the present disclosure provides an in-tool system for compacting an out-of-plane feature of a composite structure comprising a cavity formed in a tool, a stiffener preform, and an insert. The cavity has an angled surface. The stiffener preform includes an out-of-plane feature, where the out-of-plane feature has a compaction surface. The insert comprises a first face complementary to the angled surface of the cavity and a second face complementary to the compaction surface of the out-of-plane feature. The first face is opposite the second face.

Another illustrative embodiment of the present disclosure provides a method for in-tool compaction of an out-of-plane feature of a composite structure. The method includes a step of forming a stiffener preform. The method includes a step placing an insert adjacent an out-of-plane feature of the stiffener preform. The method includes a step of inserting the stiffener preform and the insert into a cavity of a tool. The method also includes a step of applying a force on the stiffener preform or the insert.

A further illustrative embodiment of the present disclosure provides a stiffener preform assembly for in-tool compaction of out-of-plane features of a stiffener preform comprising a stiffener preform, an insert, and a preform holding fixture. The stiffener preform includes an out-of-plane feature, where the out-of-plane feature has a compaction surface. The insert comprises a first face complementary to an angled surface of a cavity of a tool and a second face complementary to the compaction surface of the out-of-plane feature. The first face is opposite the second face. The preform holding fixture has a cross section that is complementary to the angled surface of the cavity of the tool and the first face of the insert.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. For example, the illustrative examples recognize and take into account that the compaction of out-of-plane features in an integrally stiffened structure in situ typically requires separate work cells with added tooling, facilities, time, and cost to perform especially in a monolithic, for example, non-segmented tool.

The illustrative examples recognize and take into account when bulk out-of-plane features are large, there is a high-percentage chance of the feature physically impacting the tool and damaging the preform.

The illustrative examples also recognize and take into account that removing a compacted preform having out-of-plane features from a tool is difficult and damage to the preform is often unavoidable.

Thus, the illustrative examples provide low-cost, tailored forming tools that automatically provide compaction when inserted into a base mold tool, wherein the forming tools and compacted preform are easily removed from the base mold tool without damage to the preform.

Figure 1:
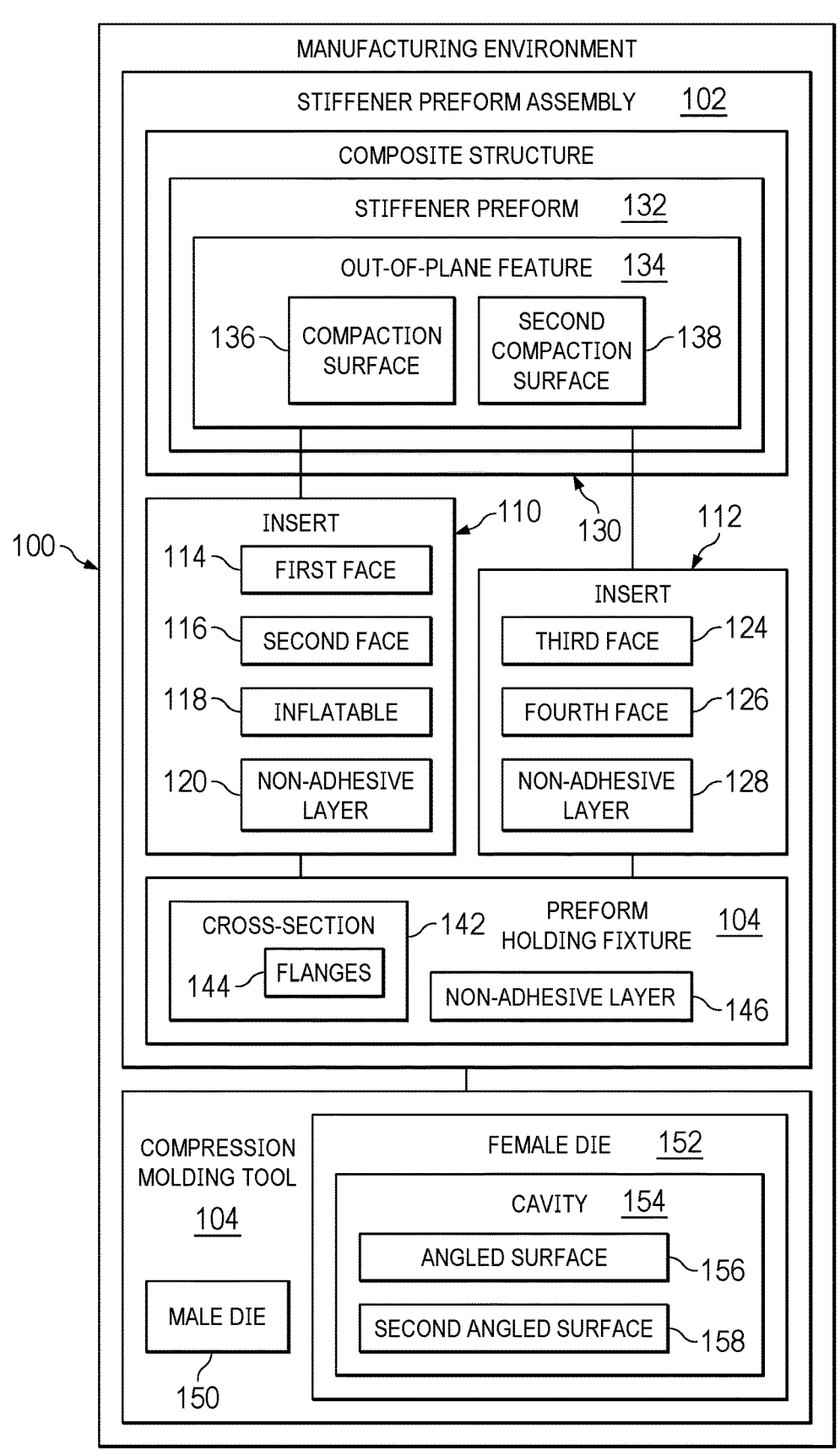
FIG. 1 is an illustration of a block diagram of a manufacturing environment in accordance with an illustrative example.

With reference now to the figures and, in particular, with reference to FIG. 1, an illustration of a block diagram of a manufacturing environment is depicted in accordance with an illustrative example. Manufacturing environment 100 includes stiffener preform assembly 102 and compression-molding tool 104.

In this illustrative example, stiffener preform assembly 102 includes insert 110 and insert 112. Insert 110 includes first face 114 and second face 116. Insert 110 can be any desired geometric shape but must have at least a first face opposite a second face. The shape of insert 110 is dictated by the out-of-plane feature to be formed using the insert and compression-molding tool 104. First face 114 is opposite second face 116. In other words, the location of first face 114 is on an opposing surface of insert 110 than second face 116. First face 114 and second face 116 are two opposing surfaces. Insert 110 may be of solid construction or hollow. Insert 110 may inflatable 118. Insert 110 may include non-adhesive layer 120. Non-adhesive layer 120 aides in separating insert 110 from compression-molding tool 104 and in separating insert 110 from a compacted and cured stiffener preform 132.

Insert 112 may be considered a second insert. Insert 112 includes third face 124 and fourth face 126. Like insert 110, insert 112 can be any desired geometric shape but must have opposing surfaces or faces. The shape of insert 112 is dictated by the out-of-plane feature to be formed using the insert and compression-molding tool 104. Third face 124 is opposite fourth face 126. In other words, the location of third face 124 is on an opposing surface of insert 112 than fourth face 126. Like insert 110, insert 112 may be of solid construction or hollow. Insert 112 may also be inflatable. Insert 112 may include non-adhesive layer 128. Non-adhesive layer 128 aides in separating insert 112 from compression-molding tool 104 and aides in separating insert 112 from the compacted and cured stiffener preform 132.

In this illustrative example, stiffener preform assembly 102 includes composite structure 130. Composite structure is formed from stiffener preform 132. Stiffener preform 132 is typically fabricated off-site and brought to compression-molding tool 104 for compaction and curing. Stiffener preform 132 has out-of-plane feature 134. For example, out-of-plane feature 134 can be the blade section of a "T" stiffener. The blade section requires a specific thickness under compaction. Out-of-plane feature 134 includes compaction surface 136. Out-of-plane feature 134 may include second compaction surface 138. Compaction surface 136 is complementary to second face 116 of insert 110. Second compaction surface 138 is complementary to fourth face 126 of insert 112. The final shape of out-of-plane feature 134 determines the presence of compaction surfaces. For example, the blade of a "T" stiffener will include a first and a second compaction surface on opposite sides of the blade.

In this illustrative example, stiffener preform assembly 102 includes preform holding fixture 140. Preform holding fixture has cross section 142. Cross section 142 is complementary to the cavity of a compression-molding tool. Cross section 142 is also complementary to first face 114 of insert 110 and, if present, third face 124 of insert 112. Cross section 142 may include flanges 144. Preform holding layer may also include non-adhesive layer 146. Non-adhesive layer 146 aides in separating stiffener preform assembly 102 from compression-molding tool 104 and in separating insert 110 from preform holding fixture 140. Preform holding fixture 140 constrains stiffener preform 132, insert 110, and if present, insert 112 together as stiffener preform assembly 102. Preform holding fixture 140 provides ease of transportation to and insertion the stiffener preform and inserts into the cavity of a compression-molding tool.

In this illustrative example, manufacturing environment 100 includes compression-molding tool 104. Compression-molding tool 104 typically includes male die 150 and female die 152. Male die 150 can be substituted with a compression plate. Female die 152 includes cavity 154. Cavity 154 has at least angled surface 156 and may include second angled surface 158. Angled surface 156 is complementary to first face 114 of insert 110. Second angled surface 158 is complementary to third face 124 of insert 112. Angled surface 156 is complementary to cross section 142 of preform holding fixture 140. Second angled surface 158 is complementary to cross section 142 of preform holding fixture 140.

An advantage provided by the illustrated examples include eliminating the difficulty of loading a stiffener preform having out-of-plane features, such as a blade of a "T" stiffener, into a compression mold tool. Another advantage is the illustrative examples make it easier to machine high-smoothness faces on the inserts versus the cavity of the compression mold tool and because the cavity of the mold tool can be larger, post-cure part removal is easier. The inserts can be fabricated from relatively low-cost materials, such that it is cost-effective to fabricate multiple toolsets of inserts as opposed to multiple sized/shaped cavities in a compression mold tool. Exact shape of inserts can be tailored for tight dimensional tolerances. Inserts can be fabricated of higher-CTE materials to allow for thermal expansion after insertion into a compression-molding tool to provide additional compaction pressure during processing and easier removal after cooldown. The use of the inserts allows for change out of stiffener preform out-of-plane feature geometries within a common compression-molding tool envelope without having to fabricate a new compression-molding tool for each desired geometry.

Figure 2:
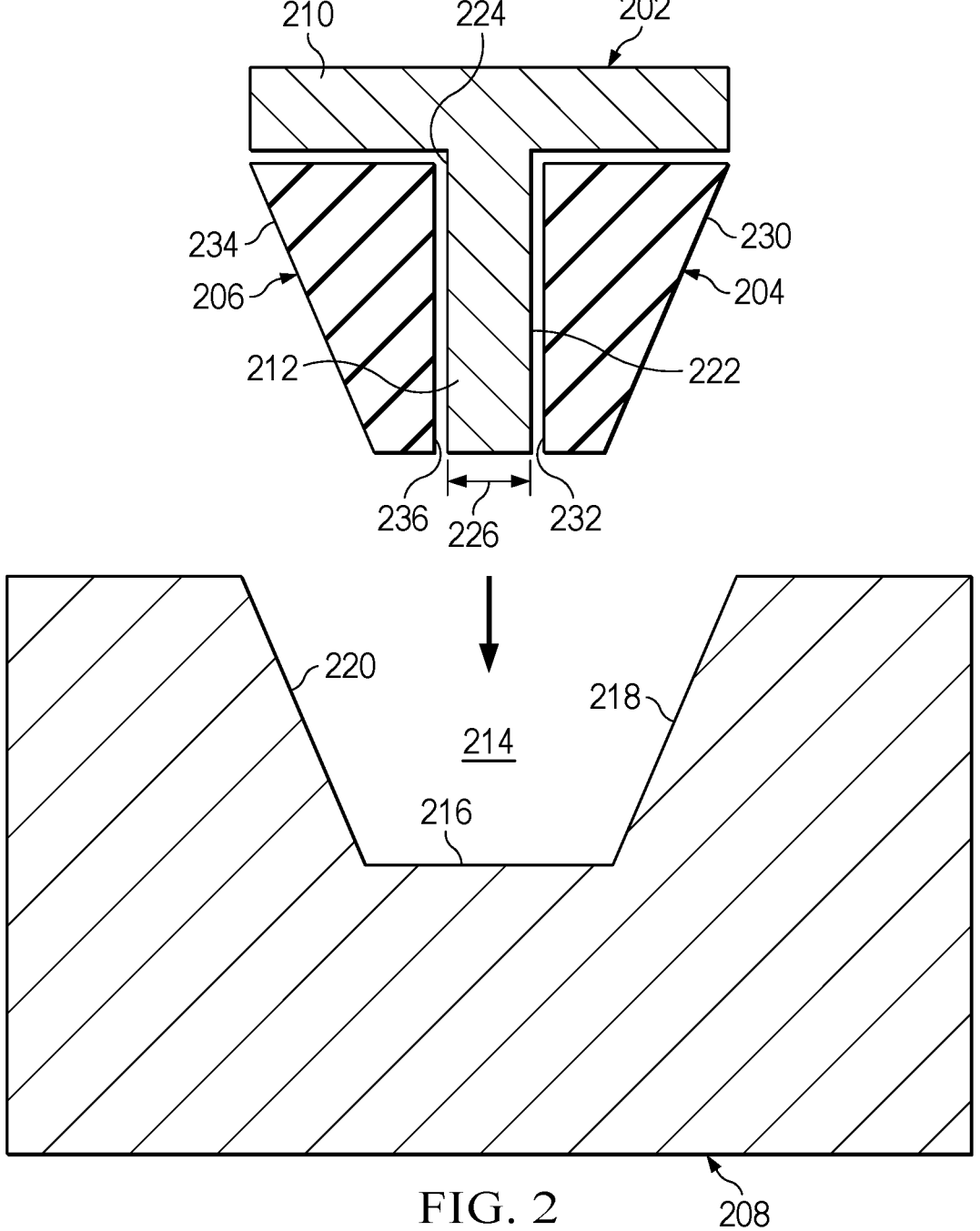
FIG. 2 is an illustration a stiffener preform and an insert for location within a tool in accordance with an illustrative example.

Turning now to FIG. 2, an illustration of stiffener preform 202 and inserts 204, 206 for location within tool 208 is depicted in accordance with an illustrative example. In this illustrative example and the illustrative examples that follow, the same reference numeral may be used in more than one figure. This reuse of a reference numeral in different figures represents the same element in the different figures. The components illustrated in FIG. 2 are examples of physical implementations of stiffener preform 132, insert 110, insert 112, and compression-molding tool 104 shown in block form in FIG. 1.

Stiffener preform 202 is "T"-shaped having top 210 and blade 212. In this illustrated example, blade 212 represents an out-of-plane feature. Stiffener preform 202 is not limited to "T" shape and could be any preform shape that includes an out-of-plane feature. Blade 212 includes compaction surface 222 and second compaction surface 224. Compaction surface 222 is opposite second compaction surface 224. In other words, blade 212 comprises two opposite lateral sides which will be subjected to compaction forces, the two lateral sides are compaction surface 222 and second compaction surface 224.

Tool 208 defines cavity 214. Tool 208 represents a female half of a standard compression-molding tool which cooperates with a male half of the tool (not shown) to apply compaction pressure on a preform. Cavity 214 is defined by bottom 216 flanked by angled surface 218 and second angled surface 220.

Insert 204 and insert 206 are illustrated as mirror images of each other. However, the shape and size of insert 204 and insert 206 do not have to be equal or mirror images. The shape and size of insert 204 and insert 206 conform to desired stiffener, out-of-plane feature, and tool geometries. The shape and size of insert 204 and insert 206 is determined by the desired shape of the out-of-plane feature of stiffener preform 202 to be compacted by tool 208 and the shape/dimensions of cavity 214. Compaction surface 222, second compaction surface 224, and the overall desired thickness 226 of blade 212 are affected by the shape and size of insert 204 and insert 206. Insert 204 and insert 206 are sized such that when stiffener preform 202 and the inserts are loaded in cavity 214, blade 212 is compacted to thickness 226. Although two inserts are illustrated, depending on the desired shape of the compressed out-of-plane feature and the tool shape, one or more inserts may suffice.

Insert 204 includes face 230 and face 232. Face 230 is opposite face 232. Face 230 is complementary to angled surface 218 of cavity 214 and face 232 is complementary to compaction surface 222 of blade 212. Likewise, insert 206 includes face 234 and face 236. Face 234 is opposite face 236. Face 234 is complementary to angled surface 220 of cavity 214 and face 236 is complementary to second compaction surface 224 of blade 212. When one surface is complementary to another surface, it means that each surface is the same angle relative to a common orthogonal set of axes. In operation, each insert acts a wedge between blade 212 and cavity 214.

Each insert may be comprised of hard rubber (e.g., silicone), thermoplastic (e.g., Ultem®, PEEK, etc.) or metal (e.g., aluminum, tool steel, etc.). Additionally, each insert may be of solid construction or hollow. Furthermore, each insert may be inflatable. Each insert may also be coated with a non-adhesive layer to assist in removal from tool 208 and separation from a compacted and cured out-of-plane feature such as blade 212.

Figure 3:
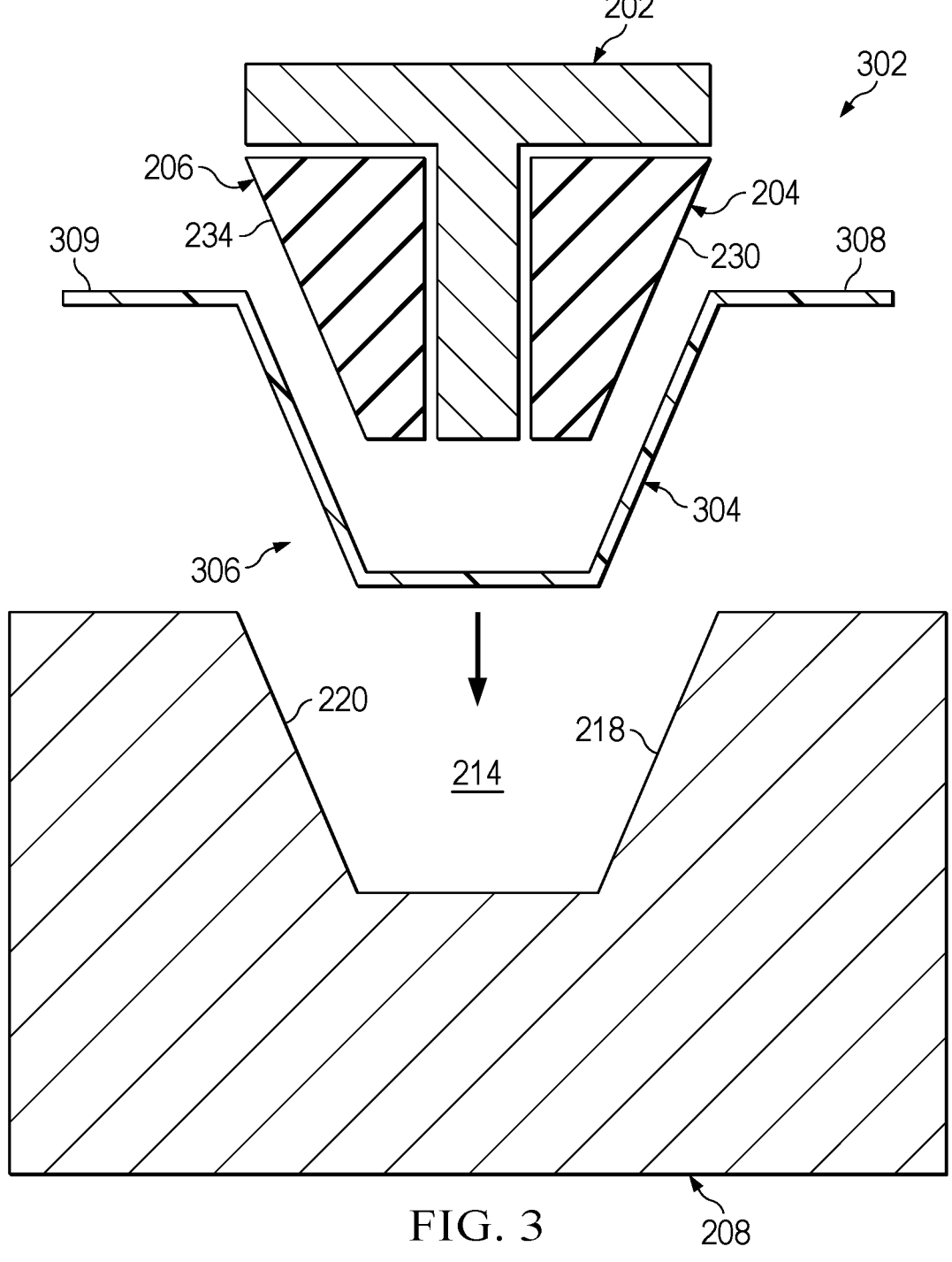
FIG. 3 is an illustration a stiffener preform assembly for insertion within a tool in accordance with an illustrative example.

With reference now to FIG. 3, an illustration of stiffener preform assembly 302 for insertion within tool 208 is depicted in accordance with an illustrative example.

Stiffener preform assembly 302 includes preform holding fixture 304, stiffener preform 202, and inserts 204, 206.

Preform holding fixture 304 constrains stiffener preform 202 and inserts 204, 206 and provides ease of transportation to and insertion into cavity 214 as a whole. Preform holding fixture 304 holds stiffener preform 202 and inserts 204, 206 in place and makes handling of stiffener preform assembly 302 easier.

Preform holding fixture 304 has cross section 306. Cross section 306 is complementary to angled surface 218 and second angled surface 220 of cavity 214. Accordingly, cross section 306 is also complementary to face 230 of insert 204 and face 234 of insert 206. Cross section 306 may also include flange sections 308, 309. Preform holding fixture 304 may be comprised of metal, thermoset, or thermoplastic.

Preform holding fixture 304 may also be coated with a non-adhesive layer to assist in removal from tool 208 and separation from a compacted and cured out-of-plane feature such as blade 212 and inserts 204, 206.

Figure 4:
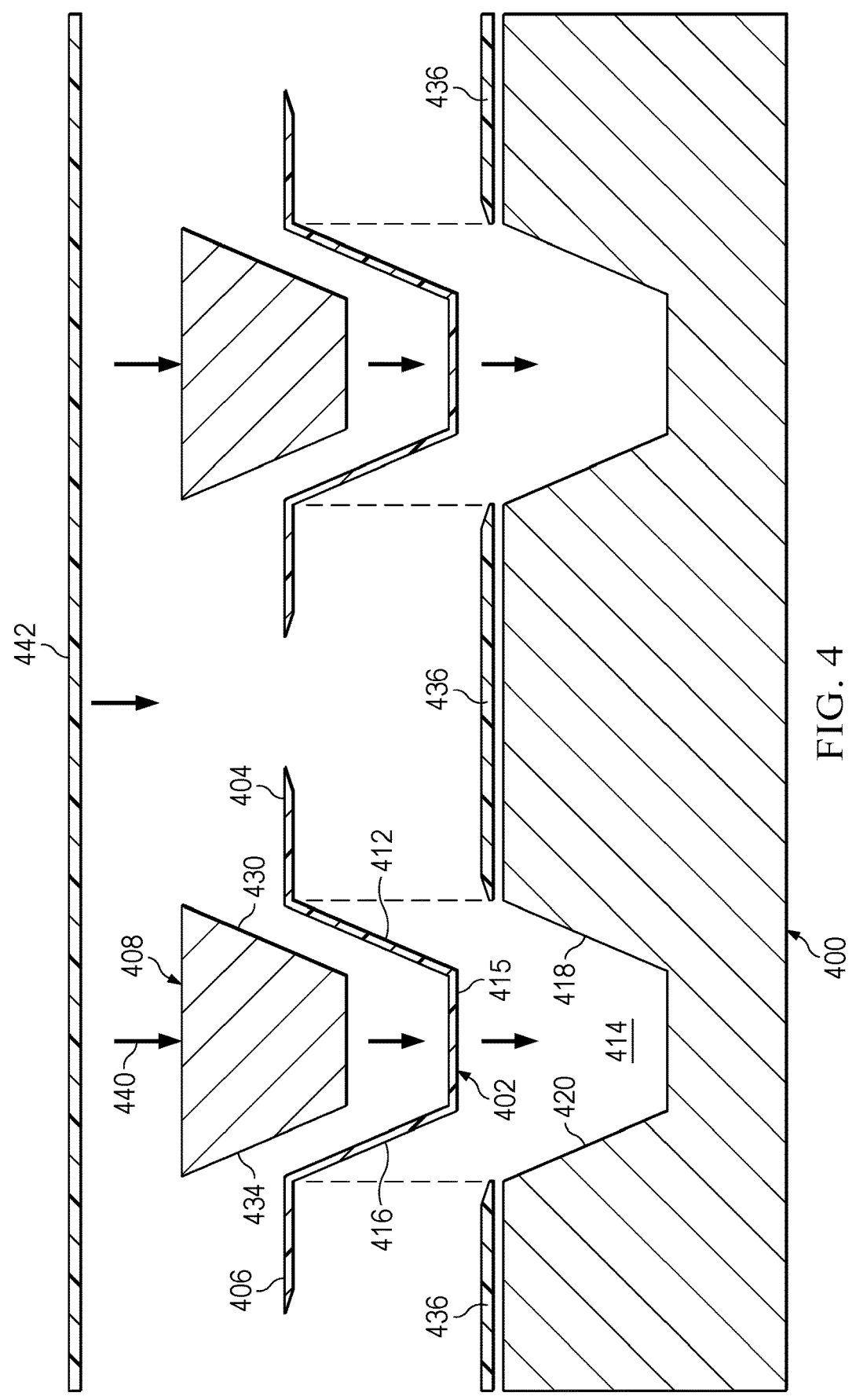
FIG. 4 is an illustration a stiffener preform assembly for insertion within a tool with plies to interleave the preform in accordance with an illustrative example.
Figure 5:
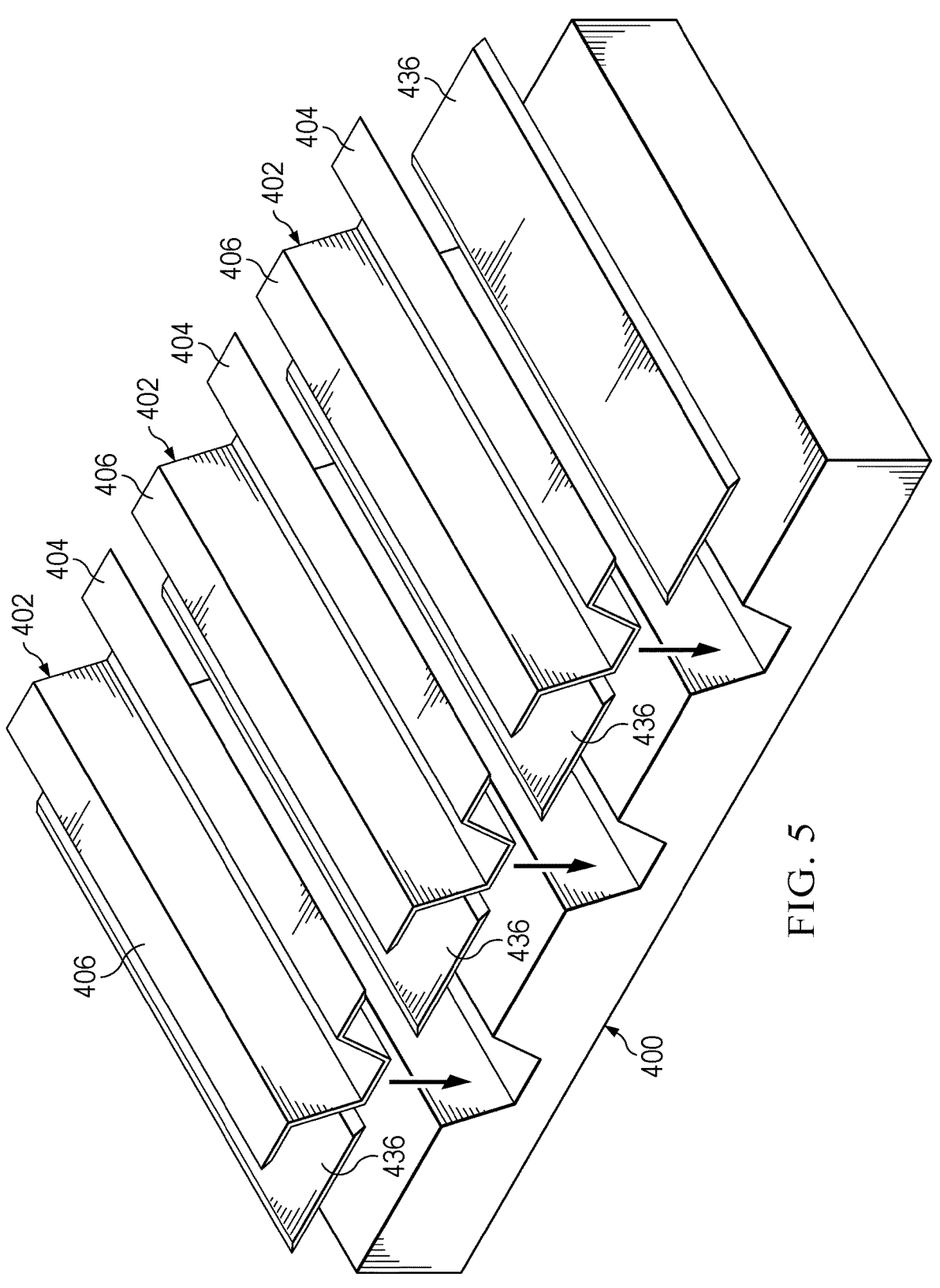
FIG. 5 is an illustration hat-stiffener preforms over skin sections for interleaving in accordance with an illustrative example.
Figure 6:
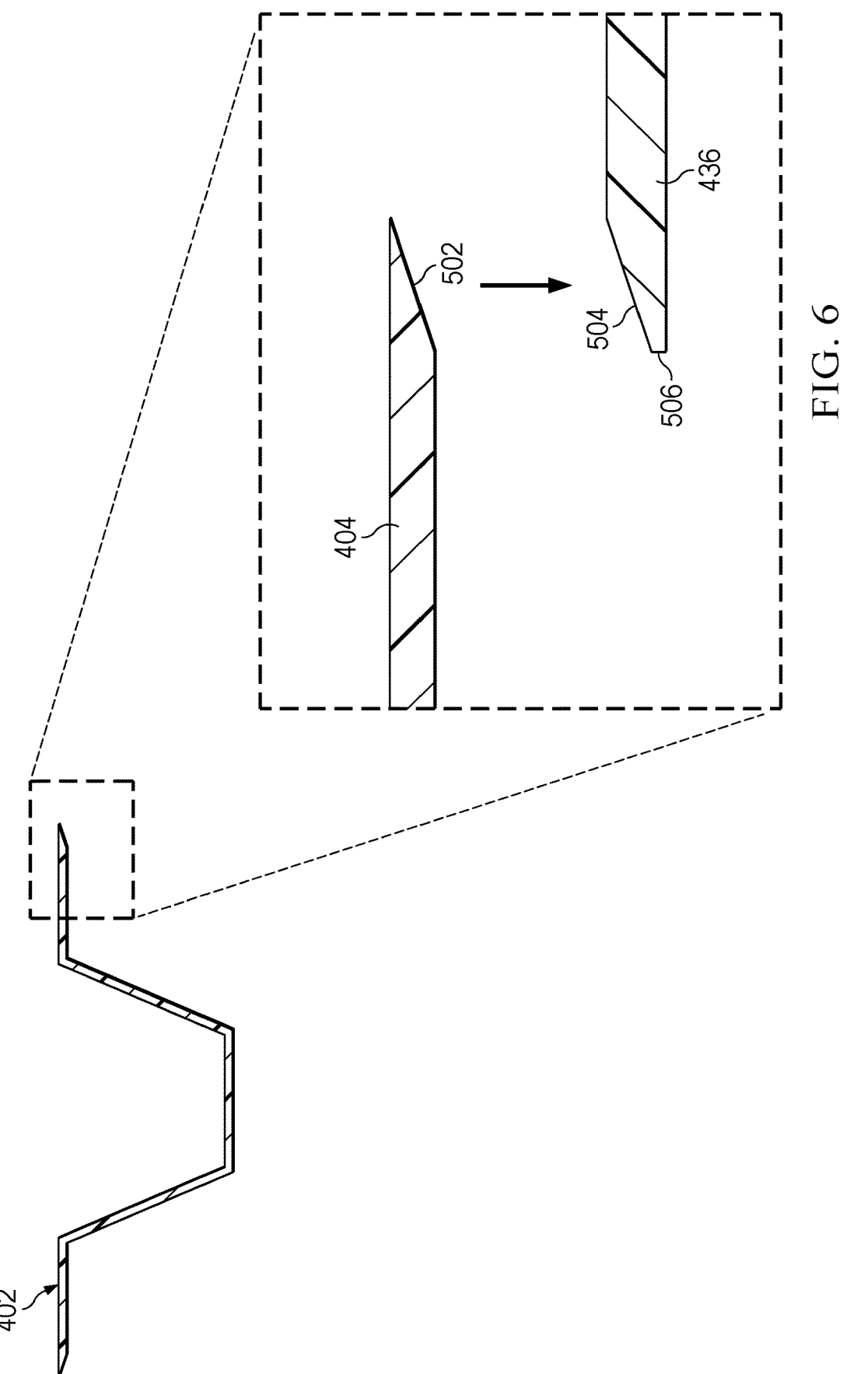
FIG. 6 is an illustration detail of taper in stiffener flange in accordance with an illustrative example.

With reference now to FIGS. 4-6, illustrations of a stiffener preform assembly for insertion within a tool with plies to interleave the preform are depicted in accordance with an illustrative example.

In this illustrative example, hat-shaped stiffener preform 402 includes a hat shape as an out-of-plane feature. The hat-shaped out-of-plane feature includes top 415 connected to sides 412, 416. Hat-shaped stiffener preform 402 includes flanges 404, 406 extending from sides 412, 416, respectively. Pressure 440 on insert 408 forces hat-shaped stiffener preform 402 into cavity 414 of tool 400. Face 430 and face 434 of insert 408 compacts sides 412, 416 of hat-shaped stiffener preform 402 against angles surfaces 418, 420 of cavity 414 in tool 400. Ply sections 436 are positioned on top of tool 400. As insert 408 compacts hat-shaped stiffener preform 402 in cavity 414, flanges 404, 406 are interleaved with ply sections 436. Skin plies 442 may be included atop hat-shaped stiffener preform 402 before or after removal of insert 408.

Each flange 404, 406 includes taper 502. The edges of each ply section 436 includes taper 504. Taper 504 includes step 506. Taper 502 of the flanges overlaps taper 504 of the ply sections to bury the interface in interior skin so that flange runout is not exposed on the surface of the joint and prone to peel stresses. Ply sections 436 are thicker than flange 404 so that the interface is not at the part surface.

Figure 7:
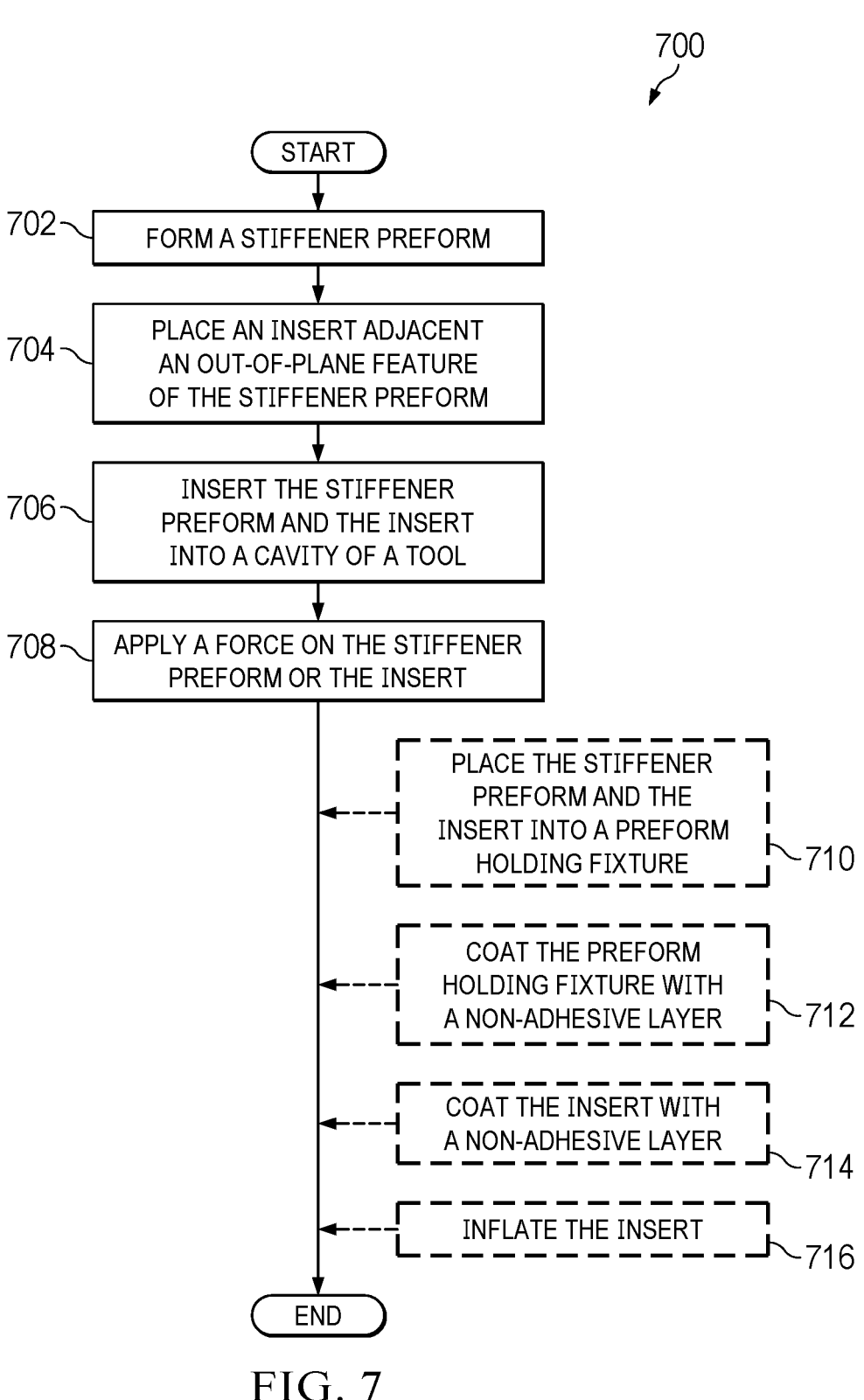
FIG. 7 is an illustration of a flowchart of a process for in-tool compaction of an out-of-plane feature of a composite structure in accordance with an illustrative example.

With reference next to FIG. 7, an illustration of a flowchart of a process 700 for in-tool compaction of an out-of-plane feature of a composite structure. The method depicted in FIG. 7 may be used in conjunction with illustrated examples depicted in FIGS. 1-6.

The process begins by forming a stiffener preform (operation 702). The stiffener preform can be formed offline and transported to a compression-molding tool. The process places an insert adjacent an out-of-plane feature of the stiffener preform (operation 704). The shape and size of the insert is determined by desired stiffener, out-of-plane feature, and tool geometry. The process then inserts the stiffener preform and the insert into a cavity of a compression-molding tool (operation 706). The insert has a first face complementary to an angled surface of the tool and the insert has a second face complementary to a compaction surface of the out-of-plane feature of the stiffener preform. The process then applies a force on the stiffener preform or the insert (operation 708). The force is such that the second face of the insert transmits a compression force on the compaction surface of the stiffener preform. At operation 710, the stiffener preform and the insert may optionally be placed into a preform holding fixture. At operation 712, the preform holding fixture may be coated with a non-adhesive layer. At operation 714, the insert may be coated with a non-adhesive layer. At operation 716, the insert may be inflated.

In some alternative implementations of an illustrative example, the function or functions noted in the blocks may occur out of the order noted in the Figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figures 8, 9:
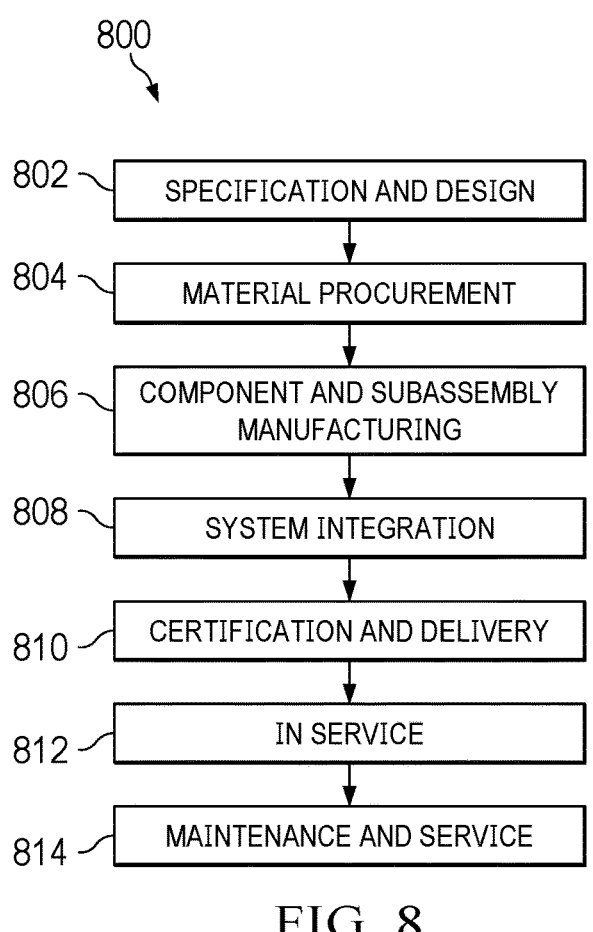
FIG. 8 is an illustration of an aircraft manufacturing and service method in the form of a block diagram in accordance with an illustrative embodiment.
FIG. 9 is an illustration of an aircraft in the form of a block diagram in which an illustrative embodiment may be implemented.

The illustrative embodiments of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with a plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800. One or more illustrative embodiments may be used during component and subassembly manufacturing 806, system integration 808, or maintenance and service 814 of FIG. 8. For example, out-of-plane feature 134 may be formed during component and subassembly manufacturing 806. As another example, out-of-plane feature 134 may be a replacement part during maintenance and service 814 of FIG. 8.

Apparatuses and methods embodied herein may be employed in manufacturing at least one component of aircraft 900. For example, out-of-plane feature 134 of FIG. 1 may be manufactured to form a portion of composite structure 130.

A tooling concept is disclosed which allows for the in-tool compaction of out-of-plane features, such as stiffeners when forming fibrous composite structures using dry-fabric preforms and resin infusion. Low-cost, tailored tooling surrounds the out-of-plane features in a manner that, when the tooling and surrounded features are inserted into a main mold tool, compaction pressure is imparted onto the features to form them to their target thickness without the need for a separate work cell or operation to perform the compaction.

The compaction of out-of-plane features in an integrally stiffened structure is difficult to perform in situ, especially in a monolithic (i.e. non-segmented) tool. An advantage provided by the disclosed tooling concept is to be able to compact the out-of-plane features in the mold tool instead of relying on a secondary operation that uses separate work cells with added tooling, facilities, time, and cost to perform the compaction.

Separate work cells with associated equipment, tooling, floor space, consumables, etc. are currently needed to perform compaction of stiffening elements with out-of-plane features, such as a blade or "T" stiffener.

The disclosed tooling insert provides low-cost, tailored forming tools that automatically provide in situ compaction when inserted into a base mold tool. The tooling insert has excellent release to prevent adhesion to the base mold tool or a composite part. The tooling insert can be made from different materials, depending on target part and materials used. Use of the insert allows for changeout of stiffener geometries within base mold tool envelope without having to fabricate an entire tool. Use of segmented inserts prevents possible tool hang-up between preform and tool.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An in-tool system for compacting an out-of-plane feature of a composite structure, comprising:
   a cavity formed in a tool, the cavity comprising an angled surface;
   a stiffener preform comprising an out-of-plane feature, the out-of-plane feature comprising a compaction surface;
   an insert comprising a first face complementary to the angled surface and a second face complementary to the compaction surface, the first face opposite the second face;
   a second insert, the second insert comprising a third face complementary to a second angled surface of the cavity and a fourth face complementary to a second compaction surface of the out-of-plane feature, the second insert continuously spaced from the insert on opposite sides of the out-of-plane feature; and
   a preform holding fixture having a cross section complementary to the angled surface of the cavity and the first face of the insert, the preform holding fixture in contact with and configured to constrain the insert, the second insert, and the stiffener preform;
   wherein the preform holding fixture, the stiffener preform, the insert, and the second insert form a stiffener preform assembly, the stiffener preform assembly configured to be transported to and inserted into the cavity as a whole.

2. The system of claim 1, wherein the preform holding fixture is positioned between the insert and the cavity.

3. The system of claim 1, wherein the preform holding fixture constrains the stiffener preform with the insert.

4. The system of claim 1, wherein the insert includes a non-adhesive outer layer.

5. The system of claim 1, wherein the preform holding fixture includes a non-adhesive outer layer.

6. The system of claim 1, wherein the cross section of the preform holding fixture includes a flange.

7. The system of claim 1, wherein the insert is inflatable.

8. A method for in-tool compaction of an out-of-plane feature of a composite structure, the method comprising:

forming a stiffener preform;

placing an insert adjacent an out-of-plane feature of the stiffener preform;

placing a second insert adjacent the out-of-plane feature of the stiffener preform;

placing the stiffener preform, the insert, and the second insert into a preform holding fixture to form a stiffener preform assembly, the preform holding fixture in contact with and constraining the insert, the second insert, and the stiffener preform;

inserting the stiffener preform assembly into a cavity of a tool, wherein the insert comprises a first face complementary to an angled surface of the cavity and the insert comprises a second face complementary to a compaction surface of the out-of-plane feature of the stiffener preform, the first face opposite the second face, and wherein the second insert comprises a third face complementary to a second angled surface of the cavity and the second insert comprises a fourth face complementary to a second compaction surface of the out-of-plane feature of the stiffener preform, the second insert continuously spaced from the insert on opposite sides of the out-of-plane feature; and applying a force on the stiffener preform or the insert such that the second face of the insert transmits a compression force on the compaction surface of the stiffener preform;

wherein the preform holding fixture has a cross section complementary to the angled surface of the cavity and the first face of the insert and wherein the stiffener preform assembly is configured to be transported to and inserted into the cavity as a whole.

9. The method of claim 8, wherein applying the force on the stiffener preform or the insert forces the first face of the insert against the angled surface of the tool.

10. The method of claim 8, further comprising:

coating the preform holding fixture with a non-adhesive layer.

11. The method of claim 8, further comprising:

coating the insert with a non-adhesive layer.

12. The method of claim 8, further comprising:

inflating the insert.

13. The method of claim 8 wherein the stiffener preform is a hat-shaped stiffener preform including flanges, the method further comprising:

interleaving the flanges with ply sections positioned on the tool.

14. A stiffener preform assembly for in-tool compaction of out-of-plane features of a stiffener preform, the assembly comprising:

a cavity formed in a tool, the cavity comprising an angled surface;

a stiffener preform comprising an out-of-plane feature, the out-of-plane feature comprising a compaction surface;

an insert comprising a first face complementary to an angled surface of the cavity of the tool and a second face complementary to the compaction surface, the first face opposite the second face; and a second insert, the second insert comprising a third face complementary to a second angled surface of the cavity and a fourth face complementary to a second compaction surface of the out-of-plane feature, the second insert continuously spaced from the insert on opposite sides of the out-of-plane feature; and a preform holding fixture having a cross section complementary to the angled surface of the cavity of the tool and the first face of the insert, the preform holding fixture in contact with the insert, the second insert, and the stiffener preform, the preform holding fixture including a non-adhesive inner layer for contact with the out-of-plane feature, the insert, and the second insert;

wherein the stiffener preform assembly is configured to be transported to and inserted into the cavity of the tool as a whole.

15. The assembly of claim 14, wherein the cross section of the preform holding fixture is complementary to the third face of the second insert and the second angled surface of the cavity of the tool.

16. The assembly of claim 14, wherein the preform holding fixture is positioned between the insert and the cavity of the tool.

17. The assembly of claim 14, wherein the preform holding fixture includes a non-adhesive outer layer.

18. The assembly of claim 14, wherein the preform holding fixture constrains the stiffener preform with the insert.

19. The assembly of claim 14, wherein the insert includes a non-adhesive outer layer.

20. The assembly of claim 14, wherein the cross section of the preform holding fixture includes a flange.

* * * * *